United States Patent

[11] 3,537,350

| [72] | Inventor | William W. Scott |
| --- | --- | --- |
| | | Raleigh, North Carolina |
| [21] | Appl. No. | 778,161 |
| [22] | Filed | Nov. 22, 1968 |
| [45] | Patented | Nov. 3, 1970 |
| [73] | Assignee | Aerotron, Inc. |
| | | Raleigh, North Carolina |

[54] CABLE SHEATH CUTTER
7 Claims, 12 Drawing Figs.

[52] U.S. Cl. .................................................. 83/439,
30/90.1, 81/9.51, 82/46, 83/444, 83/924
[51] Int. Cl. ........................................................ H02g 1/12
[50] Field of Search ............................................. 83/439,
444, 924; 82/46, 59, 60, 70.2, 101; 30/90.1, 90.6,
91.2; 81/9.5, 9.51

[56] References Cited
UNITED STATES PATENTS

| 2,346,314 | 4/1944 | Lembitz et al. ............... | 30/90.1X |
| --- | --- | --- | --- |
| 2,735,175 | 2/1956 | Tallman ........................ | 30/91.2 |
| 2,871,739 | 2/1959 | Granzow ...................... | 30/90.1 |
| 3,378,924 | 4/1968 | Porter ........................... | 30/91.2 |

FOREIGN PATENTS

| 924,632 | 8/1947 | France ........................... | 83/924 |
| --- | --- | --- | --- |

*Primary Examiner*—William S. Lawson
*Attorney*—A. Yates Dowell and A. Yates Dowell, Jr.

ABSTRACT: A cutter for the outer sheath of multiconductor cable has a member mounted by a fixed support for rotation about an axis and a slot with a circumferentially oriented blade for receiving the cable which is held against the blade in the slot as the member is rotated to cut the sheath.

Patented Nov. 3, 1970
3,537,350
Sheet 1 of 2
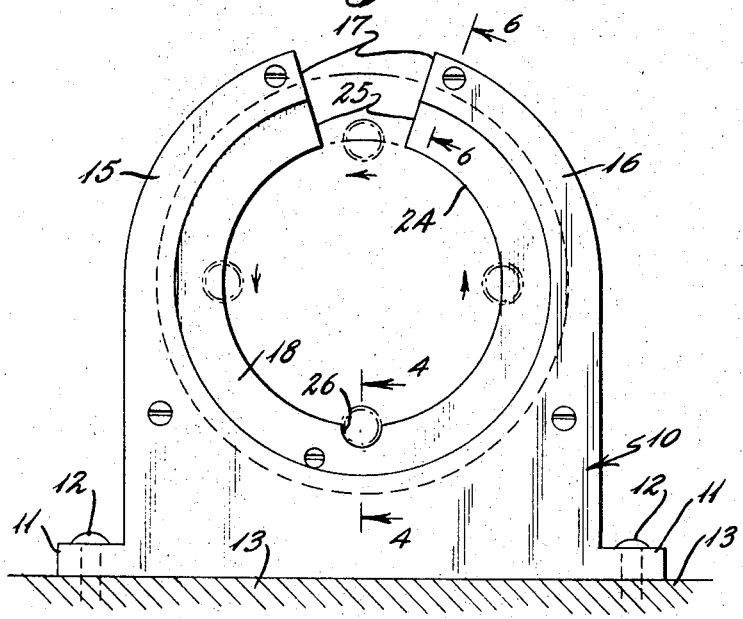
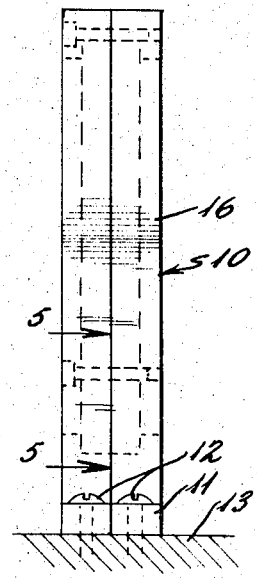
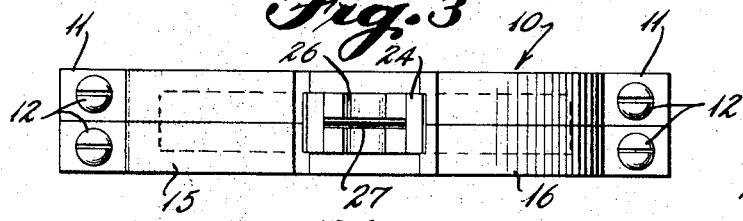
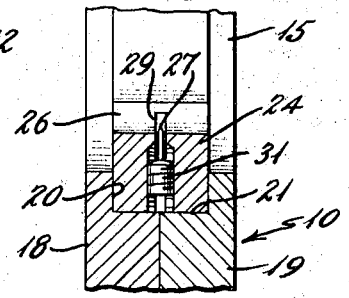
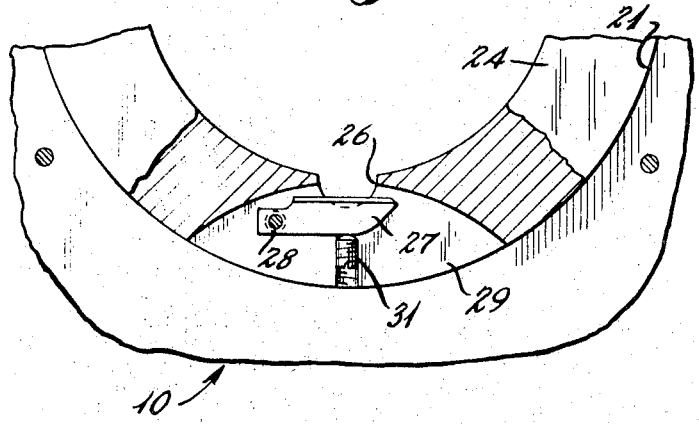
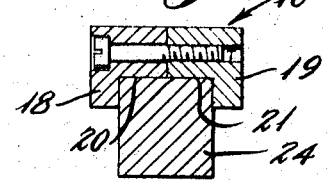
INVENTOR
WILLIAM W. SCOTT
BY
ATTORNEYS

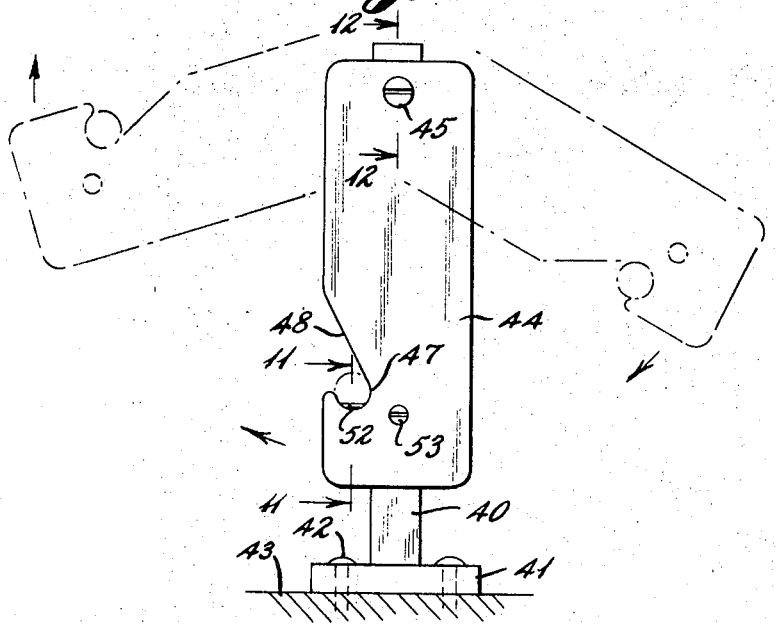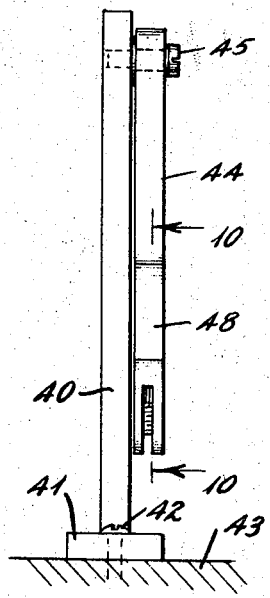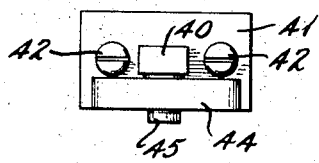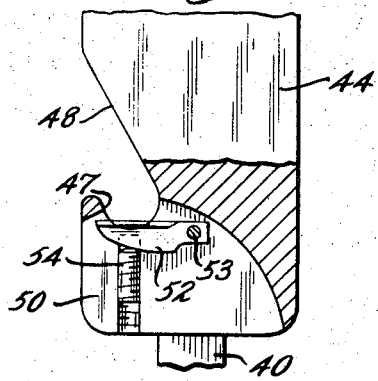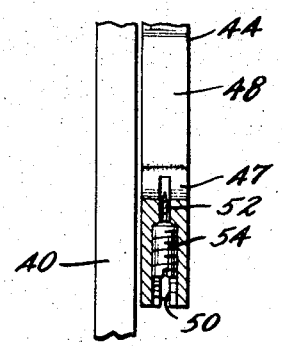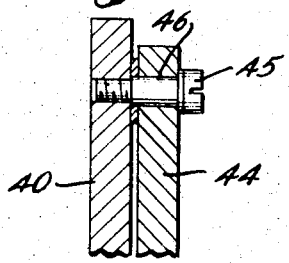
INVENTOR
WILLIAM W. SCOTT
ATTORNEYS

3,537,350

CABLE SHEATH CUTTER

BACKGROUND OF THE INVENTION

Multiconductor cables are widely used and in order to be connected to other lines, they require removal of the outer sheath or jacket. Various tools have been provided for slitting the sheath, but they have had to be held in one hand while holding the cable with the other, thereby rendering difficult the accurate cutting of the sheath. If too deep a cut is made, the insulation on the wires within the sheath may be damaged. Previous cutting devices have generally required a special blade which must be sharpened from time to time or replaced often with difficulty.

SUMMARY OF THE INVENTION

The present invention is directed to a sheath cutter which is mounted on a stationary support in order that the operator may use both hands for holding the cable and can accurately make the required cut. The device is rapid, accurate, and less tiring to use than previous devices.

Briefly stated, the present invention includes a stationary support on which a cutter holder is mounted in such a way that it can revolve, the holder having a slot for receiving the cable and a conventional blade adjustably mounted in the slot and which is circumferentially oriented with respect to the direction of rotation. The blade holder is so constructed that it may be revolved through a complete or substantially complete revolution with the cable in the slot, thereby producing a circumferential slit in its sheath.

BRIEF DESCRIPTION OF THE DRAWINGS

FIG. 1 is a front elevation of the device in accordance with the invention;

FIG. 2, a side elevation;

FIG. 3, a top plan view;

FIG. 4, an enlarged fragmentary section on the line 4–4 of FIG. 1;

FIG. 5, an enlarged fragmentary section on the line 5–5 of FIG. 2;

FIG. 6, an enlarged section on the line 6–6 of FIG. 1;

FIG. 7, a front elevation of a modified form of the invention;

FIG. 8, a side elevation of the modification of FIG. 7;

FIG. 9, a top plan view thereof;

FIG. 10, an enlarged fragmentary section on the line 10–10 of FIG. 8;

FIG. 11, an enlarged section on the line 11–11 of FIG. 7; and

FIG. 12, an enlarged section on the line 12–12 of FIG. 7.

DESCRIPTION OF THE PREFERRED EMBODIMENTS

With further reference to the drawings, the device includes a support member or carrier 10 which is mounted by brackets 11 and fasteners 12 to a support 13. The support includes a pair of upright spaced arms 15, 16 having a slot 17 intermediate their ends. The carrier 10 is preferably formed of front and rear sections 18, 19 to facilitate the forming of a circumferential raceway 20, 21 between the two halves.

Mounted in the circumferential raceway is a blade holder 24 which is of a size and shape to rotate freely within the raceway. The blade holder has spaced ends providing a slot 25 which is substantially coextensive with the slot 17 of the holder 10. As indicated in FIG. 1, at approximately its midpoint the holder 24 has a cable-receiving notch or groove 26 beneath which a blade 27 is mounted. The blade is of a conventional type such as that produced under the trademark "Exacto" and is mounted by a pin 28 in a slit 29 in the lower edge of the holder 24. An adjusting screw 31 is mounted in the holder and engages the lower blunt edge of the blade in order to maintain its adjustment within the groove 26, thereby permitting precise control of the depth of cut.

In the use of the device the operator places a cable in the groove 26 and holds it firmly against the blade. Then the operator applies a rotating motion holding the cable without twisting and as the holder and blade rotate around the cable, its sheath is cut. The mounting of the holder permits a complete revolution of the holder.

Since the device is bench mounted, the operator may use both hands to hold the cable and may accurately and easily perform the operation with a minimum of fatigue, and without danger of cutting too deeply into the cable or cutting himself with the blade.

A simplified modification of the invention is illustrated in FIGS. 7–11, which includes an upright post 40 having a lower bracket 41 for mounting by fasteners 42 to a support 43. An elongated arm 44 is rotatably mounted on the post by pin or axle member 45 which extends through an opening 46 adjacent to an end thereof. Adjacent to the other end and on a side of the arm 44, a cable-receiving notch or groove 47 is provided having an entrance way 48. The lower end of the arm has a slit 50 adjacent to the groove 47 and between the sides of which a cutter blade 52 is mounted. The blade may be of the inexpensive kind sold in hobby shops, such as that produced under the trade name "Exacto". The blade is pivotally mounted by a pin 53 and its lower noncutting edge is engaged by adjusting screw 54 by means of which the protrusion of the blade into the slot 47 is governed, and is easily replaceable.

In the use of the device the conductor cable is placed in the groove 47 and held firmly against the blade. Then the operator applies a rotating motion keeping outward pressure on the cable and causing the arm 44 to rotate about its axis thereby applying a circumferential cut to the cable. Since the post 40 prevents a complete 360° rotation, the cable may be turned slightly to cause cutting of the small portion which would otherwise not be cut.

I claim:

1. A cable sheath cutter comprising stationary support means, cutter means, means mounting the cutter means on the stationary support means for rotation about an axis, said mounting means having guide means for positioning a cable in contact with said cutter means, the guide means positioning said cable with the axis of the cable parallel to but spaced from the axis of rotation of said cutter means, whereby the mounting means may be rotated by manually holding the cable against the cutter means and the guide means and applying rotative force, thereby circumferentially cutting the cable.

2. The invention of claim 1, said cutter means comprising a blade which is mounted in a circumferentially oriented direction on said mounting means, means movably mounting the blade in said mounting means, and means for supporting the blade in adjusted position.

3. The invention of claim 1, said stationary support means having spaced arm means providing a raceway, said mounting means received in said raceway for rotation therein, said mounting means having groove means for receiving a cable, said cutter means mounted in said groove means.

4. The invention of claim 1, said stationary support means comprising post means, said mounting means comprising an arm having an upper end pivotally mounted on said post, said guide means being spaced from said upper end and on a side of said arm.

5. A cutter for circumferentially cutting a cable sheath comprising a support member, a holder swingably mounted about an axis on said support member, said holder having a generally horizontally disposed cable receiving groove, a generally vertically disposed slit extending into said groove, and cutter means mounted in said slit and movable into said groove, whereby a cable having a sheath is received within said groove and when said holder is swung about the axis the sheath is cut circumferentially by said cutter means.

6. The invention of claim 5 including means for adjusting said cutter means to control the depth of cut.

7. The invention of claim 5 in which said holder is fully rotatable relative to said support member.